United States Patent [19]

Fooshee

[11] Patent Number: 4,862,726
[45] Date of Patent: Sep. 5, 1989

[54] APPARATUS AND METHOD FOR BENDING EYEGLASSES TO SHAPE OF EAR

[76] Inventor: Paul Fooshee, 5406 Maple Ridge, Memphis, Tenn. 38134

[21] Appl. No.: 114,692

[22] Filed: Oct. 28, 1987

[51] Int. Cl.$^4$ .......................... B21D 7/06; B25B 7/02
[52] U.S. Cl. ..................................... 72/409; 72/415; 29/20; 81/3.6; 351/178
[58] Field of Search ................. 72/409, 407, 415; 29/20; 81/3.5, 3.6; 351/178, 111, 117

[56] References Cited

U.S. PATENT DOCUMENTS

| | | |
|---|---|---|
| 503,803 | 8/1893 | Orth . |
| 1,001,238 | 8/1911 | Barnes . |
| 1,573,023 | 2/1926 | Wrighton ........................... 351/178 |
| 1,701,009 | 2/1929 | Nerney . |
| 1,729,040 | 9/1929 | Halferty . |
| 1,912,948 | 6/1933 | Meister . |
| 2,229,568 | 1/1941 | Hodgkins ........................... 88/52 |
| 2,450,229 | 9/1948 | Blohm .................................. 81/3.6 |
| 2,544,067 | 3/1951 | Collinson ............................ 81/3.5 |
| 2,564,752 | 8/1951 | Collins ................................ 81/3.6 |
| 2,637,231 | 5/1953 | Schopp ................................ 81/15 |
| 2,642,765 | 6/1953 | Mears et al. ...................... 81/3.5 |
| 3,375,693 | 4/1968 | Hougen ............................. 72/353 |
| 3,402,005 | 9/1968 | Liautaud et al. ............... 351/122 |
| 3,721,275 | 3/1973 | Redinger .............................. 29/20 |

FOREIGN PATENT DOCUMENTS 1133508 11/1968 United Kingdom ................ 351/178

Primary Examiner—Daniel C. Crane
Attorney, Agent, or Firm—Arnold, White & Durkee

[57] ABSTRACT

This invention provides a system for shaping eyeglasses, utilizing a moveable die member and a supporting die member which, when brought together with an eyeglass temple therebetween, causes the eyeglass temple to bend to the desired shape. In one form there is disclosed a pliers-type device that has a male die member on one jaw and a female die member on the other jaw having a groove to hold the eyeglass temple in place. A projection or cusp in the groove of the female member causes a crimp to be formed in the eyeglass temple when the jaws are closed. This cusp corresponds to a hollow or indentation behind a typical human ear.

8 Claims, 1 Drawing Sheet

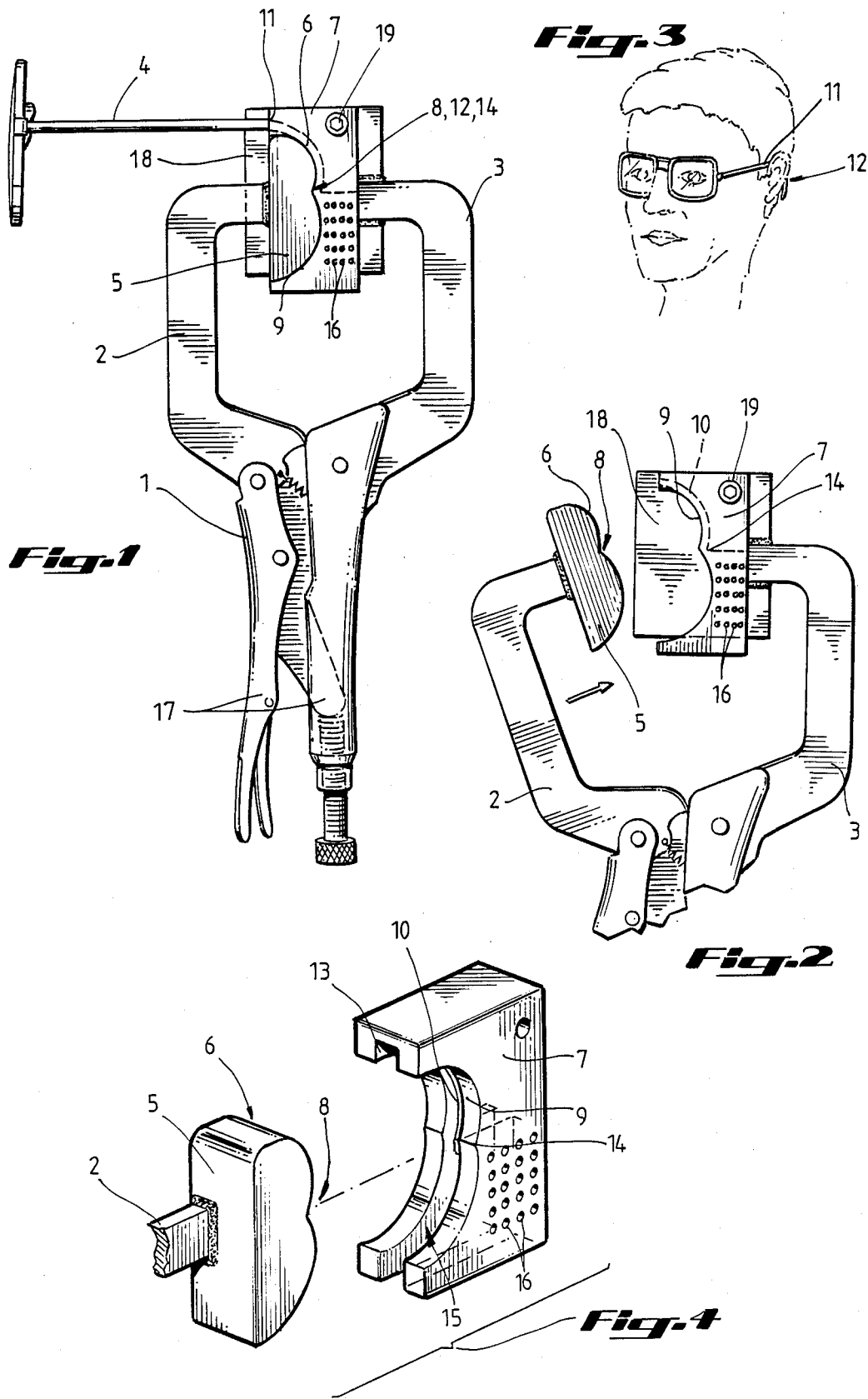

APPARATUS AND METHOD FOR BENDING EYEGLASSES TO SHAPE OF EAR

BACKGROUND OF THE INVENTION

A. Field of the Invention

This invention relates to eyeglasses, more

This invention relates to eyeglassed, more particularly to an apparatus and method for bending eyeglass temples.

B. Description of the Related Art

Eyeglasses themselves are not new. Eyeglasses have been manufactured and available for generations, primarily as an aid to persons with impaired vision. At some point it was discovered that eyeglasses could be fitted with a pair of temples attached on either side of the frame and looped around or otherwise secured to the ears. This helped keep the glasses secure, perched on the bridge of the nose. Various innovators have received patents for improved eyeglass constructions, as evidenced by U.S. Pat. Nos. 503,803; 1,001,238; 1,701,009; and more recently, 3,402,005.

Several problems and shortcomings, however, persist for eyeglass wearers. Even in this age of high technology it is often difficult to encounter a pair of inexpensive, mass-produced glasses that fit comfortably to a wearer's head. Either the glasses are too loose, in which case they slide down the bridge of the nose; or they are too snug, in which case the temples exert undue pressure on the skull, causing discomfort and sometimes even headaches. Even glasses that are custom-fitted can suffer from such shortcomings.

At the present time, there exists a continuing need for a way of quickly custom-fitting a pair of conventional eyeglasses to an individual wearer or patient to give a snug yet comfortable fit.

SUMMARY OF THE INVENTION

In a broad aspect this invention provides a system for shaping an eyeglass temple to fit around a human ear. More particularly, the invention provides a means for crimping the eyeglass temple at a location corresponding to a hollow or recess in the wearer's skull behind the ear, thus helping to provide a more secure fit. The invention also provides a modification wherein a different angle or curvature of the temple can be produced, thus providing a more individualized fit for the wearer. Thus, in one aspect, the invention can accommodate a wide range of head sizes and shapes and can be used in conjunction with conventional mass-produced eyeglasses.

The apparatus of the invention comprises a supporting member, i.e., a supporter or means for receiving, supporting and holding an eyeglass temple. The apparatus also comprises a movable member or means movably attached to the supporting member for movement toward the supporting member to bend the temple. In effect, the supporting member and the movable member act as two die members which cooperate to shape the temple without the need for twisting or torque. The coplanar movement of the die members is generally sufficient to achieve the desired result. Preferably, a member or mechanism such as a pair of handles is attached to the movable member for bringing the movable member and the supporting member together to bend the temple.

One specific embodiment of the invention resides in an apparatus for shaping an eyeglass temple to fit around a human ear, comprising: (a) a female die member having a recessed groove adapted to receive the portion of the temple designed to fit around the ear and shaped to correspond to the contour of the ear from the top point of attachment between the ear and the head and extending behind the ear about midway to the lowest point of such attachment, said groove including a cusp or projection corresponding to an indentation in said contour above the mastoid; and (b) a male die member configured to engage the female die member so as to press a temple between the two die members into the shape of the groove including said cusp.

Another specific embodiment includes a pair of opposed jaws mounted on or attached to a frame and capable of movement between open and closed positions. One jaw has a supporting means such as a die member attached thereto, which has a first curved surface. The second jaw has a movable member such as a die attached thereto and has a second curved surface. The supporting die member and the movable die member come together to bend an eyeglass temple placed between the two die members. Thus, the eyeglass temple is shaped to fit a wearer's head and ear by being placed between the supporting die member and the movable die member, and by moving the jaws from an open to a closed position so that the two die members are clamped together.

In a preferred embodiment, a temple is decidedly crimped to provide an even more secure fit for the wearer. In this embodiment, the groove is provided with a projection or cusp for crimping the temple. In this embodiment, the movable die member is appropriately called a crimper. The position of the cusp corresponds to a recess which exists on each side of the human head in the crease behind the ear where the ear attaches to the skull. The location of this recess is surprisingly uniform in spite of the wide variety of ear shapes, and a single pair of dies will generally be satisfactory in implementing the present invention. To the extent it is deemed desirable or necessary to take into account occasional variations in the position of the ear recess from one person to another, two or more sets of die members having somewhat different contours or shapes may be employed.

The present invention also includes a method for bending an eyeglass temple. In a broad sense the method comprises placing an eyeglass temple that may already be bent to some degree between two die members. When the die members are brought together, sandwiching the eyeglass temple, the eyeglass temple is bent to the desired shape. When one of the members has a groove with a cusp, the temple is pressed into the shape of the groove, including the cusp. No twisting or torque is required.

BRIEF DESCRIPTION OF THE DRAWINGS

FIG. 1 is a right side view of a preferred embodiment of the invention, wherein the jaws are in a closed position. The handle of the apparatus is to be considered to be the rear or back part of the apparatus. In this illustration, the eyeglass temple is being shaped by the apparatus.

FIG. 2 is a right side view of the jaws of the preferred embodiment in an open position.

FIG. 3 is a perspective view of eyeglass frames as typically worn on a patient.

FIG. 4 is a perspective view of the right and front sides of a crimper and supporting member in an open position.

DETAILED DESCRIPTION OF THE PREFERRED EMBODIMENT

A preferred embodiment of the present invention is illustrated by way of the example shown in FIGS. 1, 2 and 3. With specific reference to FIGS. 1 and 2, an apparatus for shaping an eyeglass temple includes a pair of opposed jaws 2, 3 movably and rotatably connected to one another. At least one of the jaws 2, 3 is mounted for movement to and from the other between open and closed positions.

From the illustrations, it can be seen that the embodiment shown there is a pliars-type device, a converted vise-grip. The conventional jaws of the vise-grip have been removed and replaced by jaws typically found as part of a c-clamp. Most coventional vise-grips have a cam-operated latching mechanism that causes them to snap shut as the jaws are closed. This feature is included in the preferred embodiment. One reason for this is that greater leverage is provided to bend and shape the eyeglass temple 4. By simply moving the jaws to a closed position, the operator can quite easily bend the temples. A steel embodiment is particularly effective, because it is both durable and heavy. Thus, this embodiment requires minimum effort for maximum leverage by the operator.

This embodiment is further preferred because the apparatus provides a screw for adjusting the closure of the jaws. This adjustable feature permits different diameter temples to be used with the device. When the screw is tightened the closed jaws clamp together tightly to mate the die members, but when the screw is loosened sufficiently the die members do not touch.

There is no limitation as such on the types of eyeglass temples that may be used with this invention. Obviously, the temple must be made of some bendable material that will not break when force is applied to it. Small gauge wire is preferred. But even plastic temples may be used with the invention. If the plastic is brittle, it will be generally desirable to heat the plastic to make it bendable.

A movable male die member 5 which has a curved surface 6 is attached to the first jaw 2. In a preferred embodiment this member is referred to as a "crimper." Preferably, it is be made of a hard, durable material such as steel that will cause a temple to bend in the desired manner. In the preferred embodiment, where a closed groove is part of the female die member, the male die member is wider than the closed groove.

In the preferred embodiment, the surface 6 of the male die member or crimper is curved to correspond to the curvature of a typical human ear, i.e., where the ear connects to the skull. The curvature profile can best be seen in FIG. 1 which shows a side view of the apparatus. As illustrated in FIG. 1, the surface 6 should be curved along the same axis as the temple 4 when the temple 4 is inserted or placed between the supporting member 7 and the movable member 5. Thus, in operation the temple 4 will be bent in a manner corresponding approximately to the curvature of the ear. Preferably, the temple 4 is to some degree already bent.

In an especially preferred embodiment, the curved surface of the male die member has an indentation or channel 8 running perpendicular to the curvature 6 and to the axis of the temple 4. This indentation 8 fits the cusp 14 on the female die member 7 (discussed below). This indentation 8 should be positioned at a point on the curved surface 6 that corresponds substantially to the recess, hollow or indentation that is found behind a typical human ear where the ear attaches to the skull. This particular recess or hollow is a slight indentation found in the temporal bone behind the ear from about one-half to about one-third of the way down from the top of the ear where it connects to the skull. The inventor has found that if a human ear is selected at random and the appropriate measurements taken, the resulting indentation will be sufficient for most eyeglass fitting purposes.

The apparatus illustrated in FIGS. 1-3 also comprises a female die or supporting member 7, which is attached to the second jaw 3. This female supporting member 7 has a curved surface 9 that faces and engages or mates with the curved surface 6 of the male member when the jaws 2, 3 are closed. This engagement can be seen in FIG. 1. Accordingly, the curved surface 9 of the female member 7 is curved in a direction that is complementary to the curved surface 6 of the male member 5. Whereas the male member 5 presents a convex surface, the female member 7 presents a concave surface.

In the illustrated embodiment, running along part of the surface 9 of the female supporting member 7 is a closed groove 10. This closed groove 10, which may also be described as a channel, runs along the surface 9 parallel with the curvature of the surface 9 of the female supporting member 7 and also parallel to the axis of the temple 4 when the temple 4 is placed between the two members 5, 7. Thus, the closed groove 10 is capable of receiving and supporting an eyeglass temple 4 so that when the jaws 2, 3 of the apparatus are closed, the temple 4 is bent and shaped to the desired curvature.

The closed groove 10 should be long enough to receive the portion of the eyeglass temple 4 which is to be bent. In other words, the closed groove 10 should be long enough to allow the temple 4 to be bent from the point 11 at which an eyeglass touches the top of the wearer's ear to the point 12 that corresponds with the recess or hollow behind the ear in a typical human skull. It is conceivable to have a supporting member 7 that has a groove 10 running along the entire surface 9 of the supporting member 7. Such could be the case, for example, if an embodiment were to be constructed to shape a temple that loops back around the ear. Such an embodiment, however, would not be preferred, mainly because it would not accommodate different sized and shaped temples. One advantage of the open slot, described below, is that it can be adjusted to accommodate different sizes and shapes of glasses.

The preferred embodiment, illustrated in FIGS. 1, 2 and 4, shows a closed groove 10 which is about two millimeters to about 5 millimeters deep and about 2 millimeters to about 5 millimeters wide. The width can of course be varied, depending on the size of the temples to be shaped. The preferred length, however, is the distance from the front end 13 of the groove 12 to the projection 14, which is discussed below.

In the preferred embodiment, there is a cusp or projection 14 at the end of the groove 10 for crimping the temple 4 when the two die members, i.e., the supporting member 7 and moveable crimper 5 are mated. This projection 14 should mate with the indentation 8 on the moveable crimper 5 when the jaws 2, 3 are moved to a closed position (see FIGS. 1 and 4). In the most preferred embodiment, the closed groove 10 stops abruptly at the peak of the projection 14.

The preferred embodiment also comprises an open slot 15 in the supporting member 7 continuous with or tandem to the closed groove 10. In this embodiment, it can be seen that the open slot 15 has the same width as the closed groove 10, and is actually an extension of the same groove 10 except that its depth is extended so as to penetrate to the other side of the supporting member 7. Thus it is sized to receive the same width temples. The open slot 15 is found on the other side of the projection 14 from the closed groove 10.

Another advantageous feature provided in this preferred embodiment is a plurality of small apertures 16 on either side of the open slot in the supporting member 7. Each small aperture 16 should be large enough to receive a pin sturdy enough to bias the back part of the eyeglass temple 4 when the jaws 2, 3 are closed. A small steel pin is generally sufficiently sturdy to hold most eyeglass temples.

FIG. 4 shows the preferred location of the apertures or pin holes. Preferably there are five columns of four apertures per column. The number of apertures can be varied to accommodate a different range of temple shapes and sizes. The uppermost apertures are positioned in such a way that when one is filled with a pin projecting across the open slot, it provides a point of leverage or bias for the temple to be bent. Each hole is positioned a measured distance from the female die surface 9. Generally, this measured distance corresponds to the cross sectional height of the temple. Another consideration is the distance from the hole to the closed groove, i.e., the cusp. The selection of the hole distance from the cusp generally depends on the size and shape of the patient's eyeglass temples. Some are longer than others, and some require a tighter curvature than others. Choosing the proper aperture to fill with a pin is a matter of discretion and judgment for the person bending the temple.

In operation, therefore, when an eyeglass temple 4 is inserted in the female supporting member 7, i.e., laid in the open slot 15 and closed groove 10, and the moveable male member 5 is moved to a closed position, the bottom of the closed groove 10 and the pin in the open slot 15 will support the eyeglass temple 4 and bias it against the moveable male member, causing the temple 4 to be bent to the appropriate shape.

The embodiment of FIGS. 1-3 also provides a movable member or mechanism 17 for moving the jaws 2, 3 together from the open position to the closed position to bend an eyeglass temple 4 placed in the groove 10. As depicted in FIG. 1, a preferred movable mechanism 17 comprises a pair of operating handles 17 connected to the jaws 2, 3. Thus a human operator can cause the eyeglass temple 4 to be bent to the desired shape by merely squeezing the operating handles 17 without any twisting or torque. It will be recognized, however, that the invention is in no way limited to human means for bending an eyeglass temple 4. Alternative specific embodiments are also included, as for example, electric or hydraulic means for moving the movable member 5 toward the supporting member 7.

Also provided in the preferred embodiment of FIGURES 1-3 is a plate 18, which is part of the lower jaw 3. The female supporting member 7 is preferably removably and rotatably attached to this plate 18 by means of a connector 19 which may be a simple allen screw. This advantageously permits the replacement of a different sized female die member or one having a different diameter groove.

In a preferred embodiment of the method, an eyeglass temple is bent to the desired shape by a series of steps which include marking an eyeglass temple 4 at a point 11 where it touches the top of the wearer's ear in a normal wearing position; bending the temple in an arc while confining the temple laterally to conform the temple to the contour of the crease where the ear attaches to the skull, and crimping the arc portion of the temple so that the crimp in the temple corresponds substantially with the indentation behind the ear.

In a preferred embodiment of the method of the invention, a mark can be placed on the temple, and can then be aligned with the top 13 of the closed groove 10. The temple 4 will then fit along and into the closed groove 10 and the open slot 15. In this position, when the jaws 2, 3 are closed (i.e., when the male member is mated with the female member 7), the temple 4 will be bent, and the temple 4 will also be crimped at the portion corresponding to the projection 14 and indentation 8 on the supporting and moveable members 7, 5. In this fashion, the eyeglass temple 4 will be shaped. If the temple 4 is marked correctly, the crimp in the temple 4 will fit into the hollow of the skull when the eyeglass temple 4 is placed on the patient in a normal wearing position.

What is claimed:

1. An apparatus for shaping an eyeglass temple to fit around a human ear, comprising:
    (a) a female die member having a recessed groove adapted to receive the portion of the temple designed to fit around the ear and shaped to correspond to the contour of the ear from the top point of attachment. between the ear and the head and extending behind the ear about midway to the lowest point of such attachment, said groove including a cusp corresponding to an indentation in said contour above the mastoid; and
    (b) a male die member configured to engage the female die member so as to press a temple between the two die members into the shape of the groove including said cusp.

2. An apparatus for shaping eyeglass temples, comprising:
    a pair of opposed jaws comprising a first jaw and a second jaw, each jaw being movably connected to one another, at least one of the jaws being mounted for movement toward the other from an open to a closed position;
    a movable male die member having a curved surface and attached to the first jaw wherein the curved surface substantially conforms to the back of a typical human ear where the ear normally attaches to the skull, and wherein the male die member has an indention on the surface;
    a female supporting die member attached to the second jaw and capable of being engaged with the male die member, having a curved surface that faces the curved surface of the male die member when the jaws are closed;
    a closed groove running along part of the surface of the female supporting die member for receiving an eyeglass temple wherein the groove is from about 2 mm to about 5 mm deep and from about 2 mm to about 5 mm wide;

a projection on the bottom of the groove for crimping the temple when the female supporting die member and the movable male die member are mated;

an open slot in the female supporting die member continuous to the groove wherein the open slot is about the same width as the groove and wherein the slot has two opposing sides;

at least one small aperture in either side of the open slot in the supporting die member for receiving a pin sturdy enough to hold the back part of the eyeglass temple in place when the jaws are closed; and a means for moving the jaws from the open position to the closed position together to bend the eyeglass temple placed in the groove, wherein the means for moving the jaws comprises a pair of operating handles rotatably connected to the jaws and movable toward and away from each other and wherein the jaws are responsive to the operating handles.

3. A method for bending an eyeglass temple, comprising:

marking an eyeglass temple at a point where it touches approximately the top of a wearer's ear in a normal wearing position;

placing the temple on a supporting die member shaped to correspond to the contour of the ear from the top point of attachment between the ear and the head and extending behind the ear about midway to the lowest point of such attachment; and bending the temple by moving a movable die member into engagement with the supporting die member, so that the temple is bent from the mark to the end of the temple not attached to the eyeglass frame;

wherein one of the members has an indentation on its curved surface and the other member has a cusp on its curved surface corresponding to the indentation for crimping the eyeglass temple at a point corresponding to the cusp.

4. A method for bending an eyeglass temple, comprising:

marking the eyeglass temple at a point where it touches the approximate top of a wearer's ear in a normal wearing position;

placing the temple on a supporting means which is attached to a first jaw for holding the eyeglass temple in place wherein the supporting means has a first curved surface and is capable of mating with a movable member attached to a second jaw having a second curved surface, and wherein the mark on the temple is aligned with the part of the surface that corresponds to the to of the human ear; and bending the temple by moving the jaws together from an open position to a closed position.

5. An apparatus for shaping an eyeglass temple, comprising:

a supporting member for receiving and holding an eyeglass temple, wherein the supporting member has a curved surface; and a movable member which has a curved surface and is movably attached to the supporting member for movement toward the supporting member to bend the temple;

wherein one of the members has an indentation on its curved surface and the other member has a projection on its curved surface corresponding to the indentation for crimping the eyeglass temple at a point corresponding to the projection.

6. An apparatus for shaping an eyeglass temple, comprising:

a supporting member for receiving and holding an eyeglass temple; and a movable member movably attached to the supporting member for movement toward the supporting member to bend the temple;

wherein the supporting member ha a curved surface and a closed groove for receiving the eyeglass temple, the supporting member having the closed groove is a female die member and the movable member is a male die member, the closed groove has a constant depth and runs about halfway along the curved surface of the female die member, and the female die member additionally has an open slot running tandem to the closed groove for receiving the eyeglass temple.

7. An apparatus for shaping an eyeglass temple, comprising:

a supporting member for receiving and holding an eyeglass temple; and a movable member movably attached to the supporting member for movement toward the supporting member to bend the temple;

wherein the supporting member has a curved surface and a closed groove for receiving the eyeglass temple and the groove comprises a cusp for crimping the temple when the jaws are in a closed position.

8. The apparatus recited in claim 7 wherein the cusp corresponds to the hollow in a typical human skull located behind the ear.

* * * * *

UNITED STATES PATENT AND TRADEMARK OFFICE
CERTIFICATE OF CORRECTION

PATENT NO. : 4,862,726
DATED : September 5, 1989
INVENTOR(S) : Paul Fooshee

It is certified that error appears in the above-identified patent and that said Letters Patent is hereby corrected as shown below:

In column 1, line 8, "This invention relates to eyeglassed, more" should be deleted.

In column 6, line 36, "attachment. between" should read --attachment between--.

In column 8, line 2, "to the to" should read --to the top--.

In column 8, line 26, "member ha a curved" should read --member has a curved--.

Signed and Sealed this

Twenty-first Day of August, 1990

Attest:

HARRY F. MANBECK, JR.

*Attesting Officer*     *Commissioner of Patents and Trademarks*